April 19, 1932. N. C. SMALL Re. 18,435

PROCESS OF MAKING SHOES

Original Filed Nov. 30, 1926

N. C. Small Inventor

By C. A. Snow & Co.

Attorneys

Reissued Apr. 19, 1932

Re. 18,435

UNITED STATES PATENT OFFICE

NATHANIEL CHRISTOPHER SMALL, OF AUBURN, MAINE, ASSIGNOR TO UNITED SHOE MACHINERY CORPORATION, OF PATERSON, NEW JERSEY, A CORPORATION OF NEW JERSEY

PROCESS OF MAKING SHOES

Original No. 1,708,034, dated April 9, 1929, Serial No. 151,733, filed November 30, 1926. Application for reissue filed February 12, 1931. Serial No. 515,395.

The present invention relates to the manufacture of a turn shoe and aims to provide a novel method of securing a turn sole to its upper by operations without the necessity of channeling the sole on the flesh side of the sole, but the sole may be channeled on the grain or hair side if desired.

Another object of the invention is to provide an improved method of making turn shoes in which the upper is secured in lasted position by the use of staples or tacks.

A still further object of the invention is so to last a turn shoe that it may be sewed after the last has been removed.

With the foregoing and other objects in view which will appear as the description proceeds, the invention resides in the method hereinafter described and claimed, it being understood that changes in the precise embodiment of the invention herein disclosed may be made within the scope of what is claimed without departing from the spirit of the invention.

Referring to the drawings.

Figure 1:
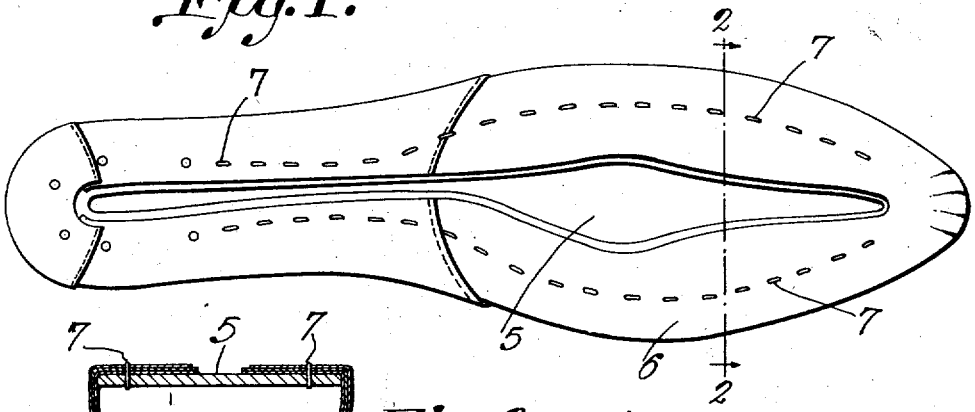
Fig. 1 is a turn shoe on a last, the upper and sole thereof being secured by stapling.
Figure 2:
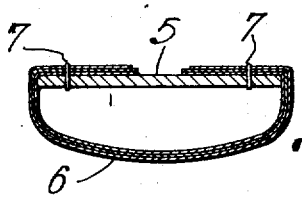
Fig. 2 is a sectional view taken on line 2—2 of Fig. 1.
Figure 3:
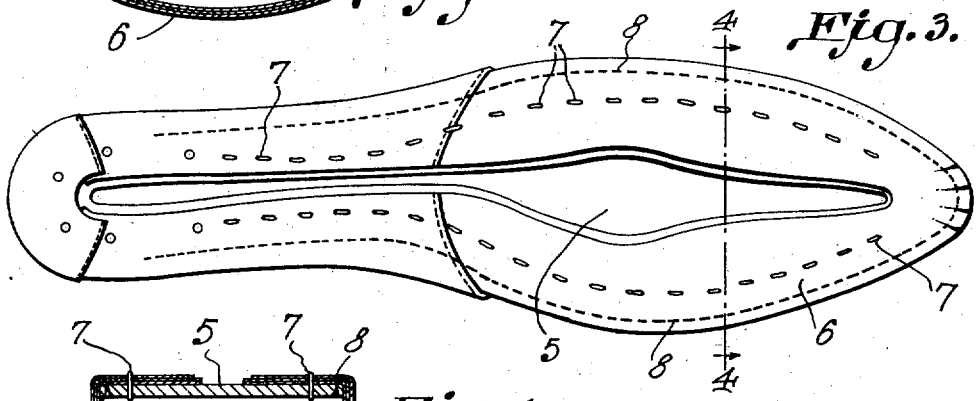
Fig. 3 is a sectional view illustrating the turn shoe as removed from the last and stitched.

Referring to the drawings in detail, the reference character 5 indicates a turn shoe sole, while the reference character 6 indicates the upper of the shoe, the sole and the upper being positioned on the last.

In carrying out the present invention, after the sole and upper have been placed on the last, the sole and upper are secured together by means of staples as indicated at 7, the staples being positioned in a line in spaced relation with the outer edge of the sole to permit the upper to be properly trimmed prior to the turning of the shoe.

Figure 4:
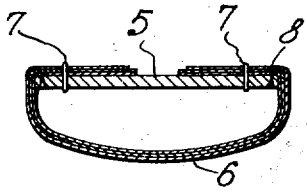
Fig. 4 is a sectional view taken on line 4—4 of Fig. 3.
Figure 5:
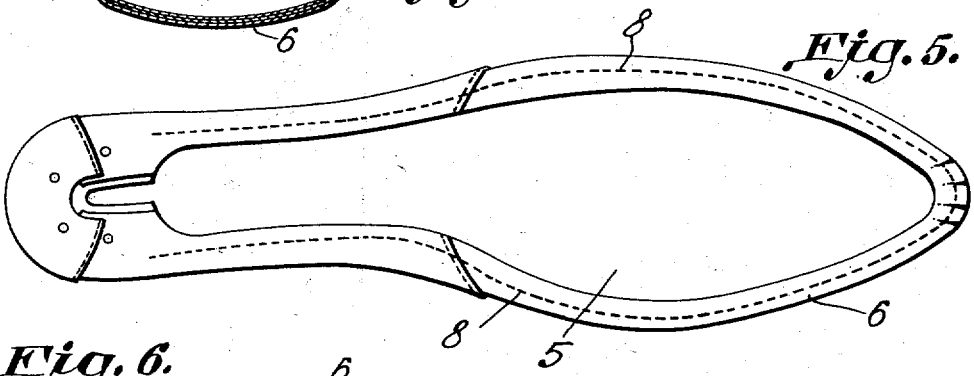
Fig. 5 is a bottom plan view illustrating the turn shoe, having been stitched and the upper trimmed.
Figure 6:
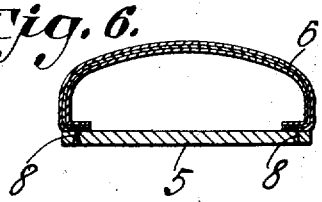
Fig. 6 is a sectional view through the finished shoe after it has been turned right side out.

After the turn shoe has been lasted and the last removed from the shoe, the sole and upper are positioned in a lockstitch sewing machine provided with a straight needle and shuttle, and the upper stitched to the sole by a line of through-and-through stitches 8 located between the staples and the edge of the sole, as shown in Fig. 4.

The next step in the present method is to trim the upper at a point between the staples 7 and the line of stitching 8, leaving the edge even and trim and removing the staples with the trimmed off portion of the upper.

The shoe is turned right side out and relasted, the trimmed portion of the upper being covered by a suitable innersole or sock-lining (not shown). Thus it will be seen that by this method a turn shoe is produced the upper of which is secured to the sole after the turn shoe has been lasted and the last has been removed from the shoe, thereby permitting the sewing operation to be accomplished with a straight needle lockstitch machine.

Having thus described my invention, what I claim as new and desire to secure by Letters Patent of the United States is:

1. A method of constructing a turn shoe, including placing a sole and an upper of a turn shoe on a shoe last so that the edges of the upper on the sole lie in close proximity to each other, securing the upper to the sole by a line of staples placed intermediate the edge of the sole and the edge of that portion of the upper contacting with the sole, securing the upper to the sole by a line of stitching disposed between the line of staples and the edge of the sole, trimming the upper between the line of staples and the edge of the sole, removing that portion of the upper in which the staples are positioned and which is trimmed from the upper, and finally turning the shoe.

2. A method of constructing turn shoes including assembling a sole and an upper of a turn shoe on a last, securing the upper in lasted relation to the sole by a line of staples placed between the edge of the sole and the overlasted margin of the upper, securing the upper to the sole by a line of stitching disposed between the line of staples and the edge of the sole, trimming the upper between the line of staples and the line of stitches to free from the upper that portion in which the staples are positioned and removing the staples with the trimmed off portion of the upper, and finally turning the shoe.

3. A method of constructing a shoe including placing a sole and an upper of a shoe on a last, stapling the upper to the sole along a line spaced from the edge of the sole, securing the upper to the sole between the staples and the edge of the sole, cutting through the upper between the line of staples and the edge of the sole, and removing the portion of upper trimmed off and the staples from the shoe.

4. A method of constructing a shoe including placing the sole and upper of a shoe on a shoe last, securing the upper to the bottom of the sole by a line of staples spaced inwardly from the edge of the sole, securing the upper to the sole by a line of stitching located between the line of staples and the edge of the sole, trimming the upper between the line of staples and the line of stitches, and removing that portion of the upper in which the staples are located and which was trimmed from the upper.

5. A method of constructing a turn shoe including placing the sole and upper of a turn shoe wrong side out upon a shoe last, securing the upper to the sole by a line of staples located between the edge of the upper and the edge of the sole, removing the last, securing the upper to the sole by a line of stitches coextensive with the line of staples, and thereafter turning the shoe.

6. That improvement in methods of making shoes which consists in securing a sole to the bottom of a last, the exposed face of the sole being unchanneled, assembling an upper on the last, laying the marginal portion of the upper flatwise upon the sole, stapling the upper to the sole, securing the upper and sole together between the line of staples and the edge of the sole, and removing the staples.

7. That improvement in methods of making shoes which consists in placing upon a last a sole the outer side of which is flat and unchanneled, assembling an upper upon the last, lasting the upper over upon the sole and securing its margin to the sole in lasted position by staples, securing the upper and sole together between the staples and the edge of the sole, and removing the staples.

8. That improvement in methods of making shoes which consists in placing flesh side out upon a last a sole the flesh side of which is flat and unchanneled, assembling an upper upon the last, lasting the upper over upon the sole and securing its margin to the sole in lasted position by staples, removing the last, securing the upper and sole together by through-and-through stitches located between the staples and the edge of the sole, removing the staples, and thereafter turning the shoe.

In testimony whereof I have signed my name to this specification.

NATHANIEL CHRISTOPHER SMALL.